United States Patent [19]

Geis

[11] Patent Number: 4,492,304

[45] Date of Patent: Jan. 8, 1985

[54] CONVEYOR CHAIN RETAINER SHOE

[75] Inventor: Robert J. Geis, Yardley, Pa.

[73] Assignee: FMC Corporation, Chicago, Ill.

[21] Appl. No.: 330,649

[22] Filed: Dec. 14, 1981

[51] Int. Cl.³ .............................................. B65G 21/20
[52] U.S. Cl. ..................................... 198/837; 474/140
[58] Field of Search ....................... 198/814, 837, 841; 474/111, 140, 144

[56] References Cited

U.S. PATENT DOCUMENTS

| 1,288,550 | 12/1918 | Forsyth | 198/837 X |
| 2,355,003 | 8/1944 | McCann | 474/111 X |
| 3,951,254 | 4/1976 | Juhrend | |

FOREIGN PATENT DOCUMENTS

| 2445286 | 4/1976 | Fed. Rep. of Germany | 474/111 |
| 1079648 | 12/1954 | France | 474/111 |

*Primary Examiner*—Joseph E. Valenza
*Assistant Examiner*—Dennis Williamson
*Attorney, Agent, or Firm*—Louis J. Pizzanelli; Richard B. Megley

[57] ABSTRACT

A retainer for preventing a conveyor drive chain from jumping off its sprocket is presented. The retainer comprises a shoe having a lining with an arcuate working surface of anti-friction material disposed over a lower run portion of the chain that is disposed over a drive sprocket. Coils springs bias the lining into engagement with the drive chain. Means are provided for maintaining the center of the working surface of the lining substantially concentric with the center of rotation of the drive sprocket.

2 Claims, 6 Drawing Figures

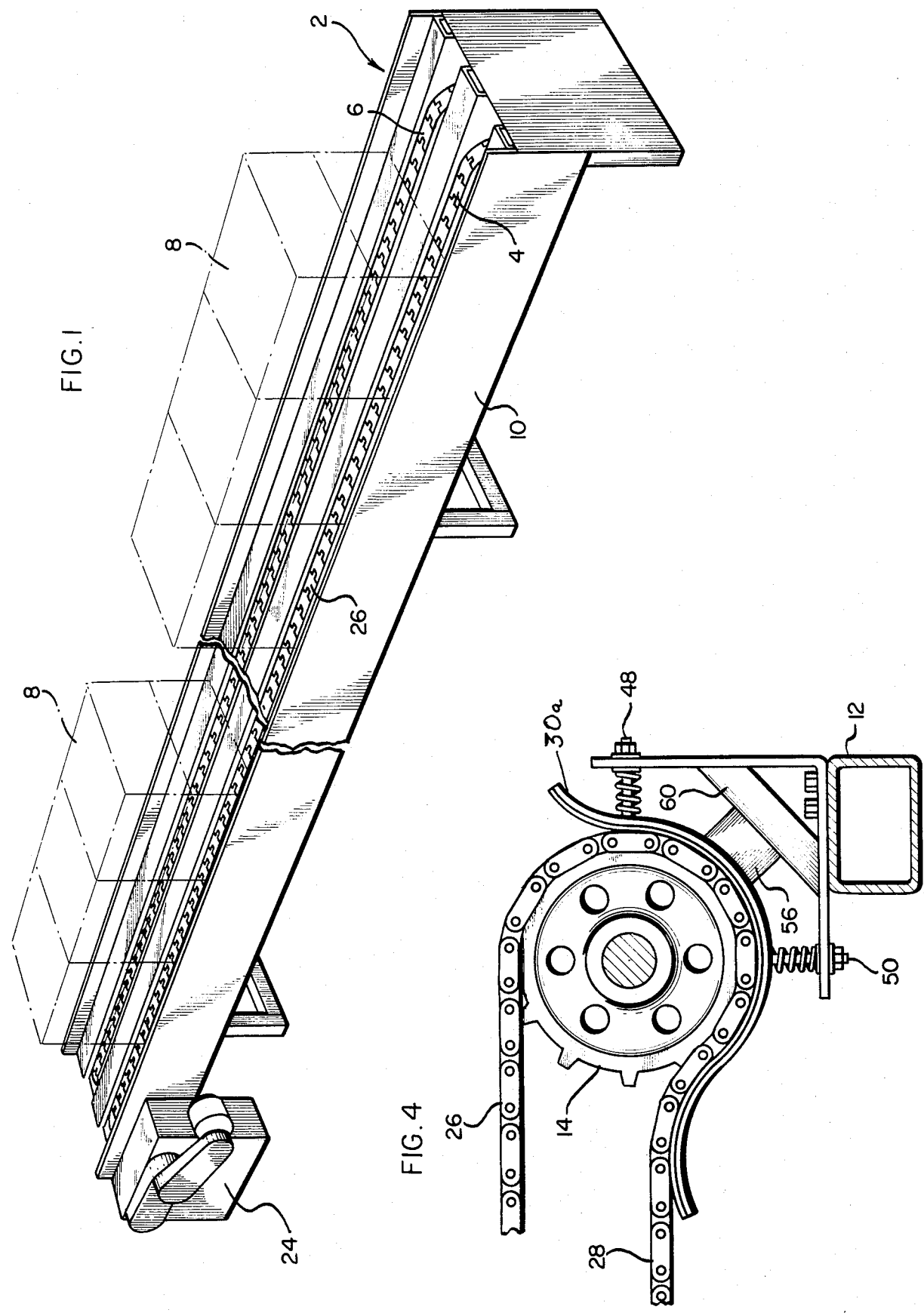

CONVEYOR CHAIN RETAINER SHOE

BACKGROUND OF THE INVENTION

This invention relates to improvements in conveyors and more particularly to devices for preventing conveyor chains from jumping off the drive sprockets around which the chains are trained.

In many industries, particularly the dairy industry, processing plants often employ conveyor lines which feed a palletizing station. At the palletizing station, cases of the bottled dairy products are stacked on pallets for loading aboard trucks. In such conveyors the upper and lower runs are relatively long, and, under normal conditions, these long runs result in a substantial amount of slack in the lower run. The slack runs permit the chains to jump from the sprockets. For example, a sixteen-tooth sprocket may actually effectively utilize only five teeth when a lower run of chain has an average amount of slack. In order to cause more sprocket teeth to engage the chain, the chain may be tightened so as to pull more links of the chain onto the sprocket. This prevents the chain from jumping from the sprocket but since there is then virtually no slack in the lower or return run of the chain, considerable wear takes place in the chain and in the drive mechanism. In due time chain links sometimes must be removed in order to take up more slack. The maintenance problem becomes quite difficult and is really a vicious cycle. The more the chain is tightened, the more teeth of the sprocket are engaged by the chain, and the less likely the chain is to jump over the sprockets; however, with the tighter chain comes more wear and tear on the drive system.

OBJECTS AND SUMMARY OF THE INVENTION

An object of this invention is to provide a retainer for preventing a conveyor chain from jumping off a sprocket without the necessity of excessive tension being applied to the chain, thereby reducing the possibility of excessive wear in the bearings, guides, and other components of the conveyor drive system.

A further object of this invention is to provide a retainer of the type stated which is relatively inexpensive and easy to install.

A still further object of this invention is to provide a retainer of the type stated which effectively increases the number of sprocket teeth actually engaging the chain as compared to conveyors which do not utilize the present invention.

In accordance with the foregoing objects, the invention comprises a retainer for preventing a conveyor chain from jumping off a sprocket. The retainer comprises a shoe having an arcuate portion with a cylindrical surface, and a lining of anti-friction material on the arcuate portion. This assembly presents a cylindrical anti-friction surface for disposition over a length of chain that is trained over a drive sprocket. A bracket supports the shoe. Means bias the shoe toward the chain to maintain the anti-friction surface of the lining against the length of chain.

In one form of the invention the biasing means comprises a pair of coil-compression springs which are spaced apart approximately 90°. Each spring has a central axis which intersects the axis of rotation of the drive sprocket with which the retainer is used. The device also provides for maintaining the center of the cylindrical anti-friction surface concentric with the center of rotation of the drive sprocket. The anti-friction surface of the shoe is disposed against at least that part of the lower run of the chain which consists of a length of chain that is trained over a lower quadrant of the sprocket.

In another aspect of the invention the shoe is pivoted to a mounting bracket, and a coil spring urges the arcuate anti-friction cylindrical surface of the lining against the chain.

BRIEF DESCRIPTION OF THE FIGURES

FIG. 1 is a perspective view of a conveyor of the general type which can utilize the retainer shoe of the present invention;

FIG. 4 is a fragmentary side elevational view, similar to FIG. 2, and showing a somewhat modified form of retainer in accordance with the present invention;

DETAILED DESCRIPTION

Figures 2, 3:
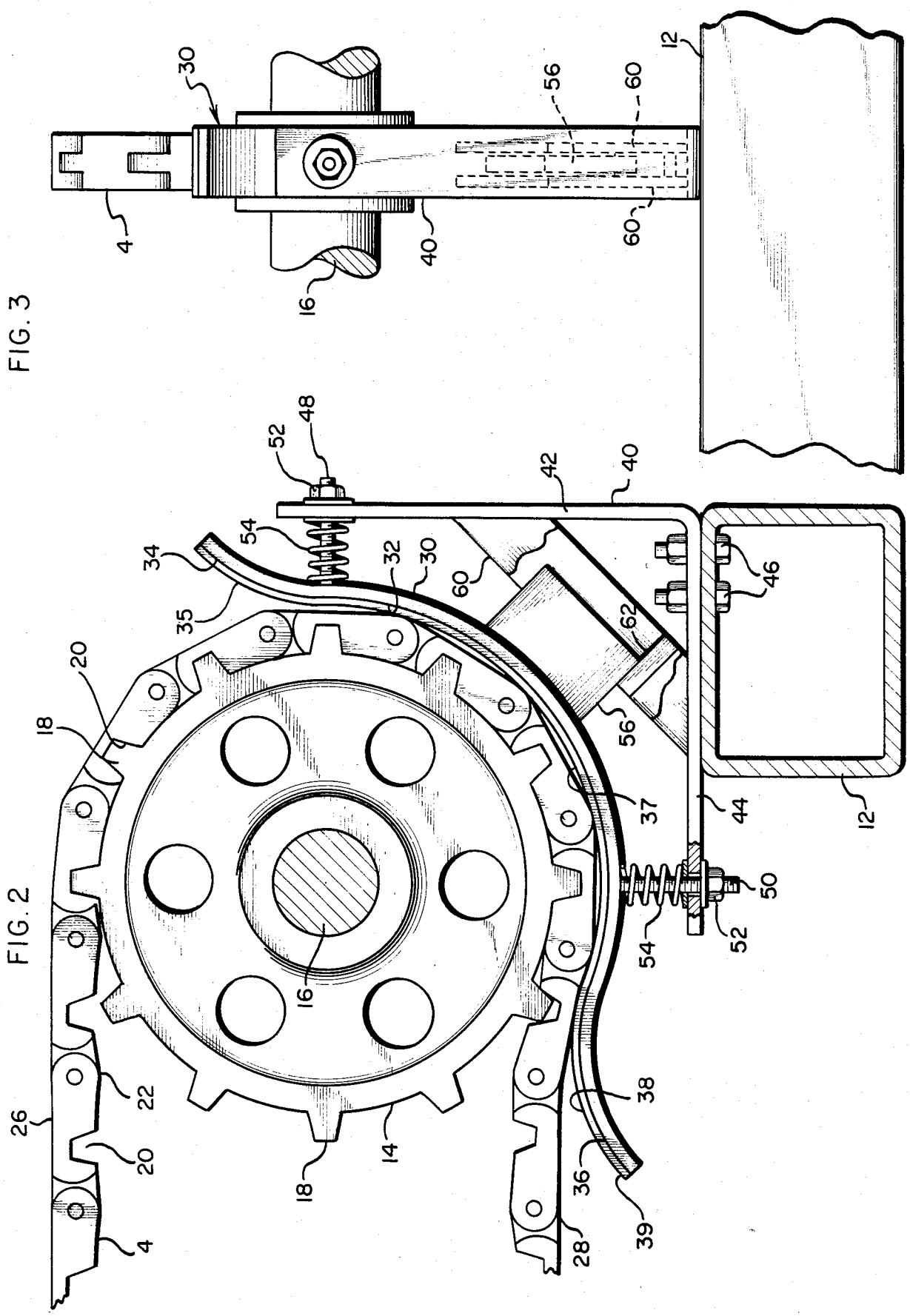
FIG. 2 is an enlarged fragmentary side elevational view, partially in section, of one end of the conveyor and showing the retainer in an operative position.
FIG. 3 is a front elevational view of the structure of FIG. 2.

Referring now in more detail to the drawings, FIG. 1 shows a conveyor 2 comprised of one of more parallel drive chains 4, 6. A fragmentary portion of one end of the conveyor is shown in more detail in FIG. 2–4. The chains 4, 6 are adapted to convey stacks of cases 8 which are shown in broken lines in FIG. 1. The conveyor 2 may have a frame structure 10 which includes at opposite ends a transverse girder 12, shown in FIGS. 2 and 4. At opposite ends of the frame 10 the conveyor is provided with drive sprockets for the respective chains. One such drive sprocket 14 is shown in FIGS. 2–4. The drive sprocket 14 is driven by a shaft 16 upon which the sprocket 14 is mounted. The drive shaft 16 is suitably journalled in the conveyor frame 10. The sprocket contains a plurality of teeth 18 which engage notches or recesses 20 in the pivotally-connected chains links 22.

Generally speaking, the conveyor will include a pair of sprockets 14 mounted on a drive shaft 16. A conventional motor-drive power unit 24 drives the shaft 16, thereby supplying power to move the conveyor chains.

The conveyor is of the type having relatively long upper and lower runs 26, 28 whereby the lower run 28 tends to develop slack sometimes causing the chain to jump over or from the sprocket 14. When the lower run 28 is relatively slack, the chain links 22 sag away from engagement with the sprocket 14. In accordance with the invention, the retainer shoe of the present invention is utilized with the sprocket 14 to positively urge a portion of the lower run 28 of the chain in engagement with the sprocket, notwithstanding slack in the chain. In this way, a sufficient number of teeth 18 will engage the chain link recesses 20 to prevent the chain from jumping off or slipping over the sprocket 14.

The retainer comprises a metallic shoe 30 of generally arcuate configuration including a portion with a concave cylindrical surface 32. In the device shown in FIG. 2, this surface 32 extends over approximately one hundred and ten degrees of arc. At the ends of the surface 32 the shoe is convexly bent to form other arcuate cylindrical chain engagement surfaces 34, 36. Positioned on the cylindrical surfaces 32, 34, 36 is a lining 38 of suitable anti-friction plastic material, for example nylon or a plastic sold under the trademark Mylar by E. I. DuPont de Nemours & Co., Inc., 1007 Market Street, Wilmington, Del. The plastic lining 38 is coextensive with the surfaces 32, 34, 36, and the exposed face of the lining likewise forms three arcuate cylindrical surfaces, 35, 37, 39 similar to the surfaces 32, 34, 36. The lining 38, which can be of one piece, can be bonded or bolted to the shoe 30, as is convenient, in a known manner.

Supporting the shoe 30 is an L-shaped bracket 40 having a vertical leg 42 and a horizontal leg 44. The horizontal leg 44 is secured by bolts 46 to the girder 12. Near their extremeties the legs 42, 44 are perforated for receiving threaded studs 48, 50 which are retained assembled with the bracket 40 by nuts 52. The studs, 48, 50 are welded or otherwise rigidly secured to the back side of the shoe 30. These studs 48, 50 are disposed so that their respective central axes are perpendicular to each other and also intersect the axis of rotation of the drive shaft 16. Furthermore, the stud 48 is located substantially in the region of the shoe where the surface 32 merges with the surface 34. On the other hand, the stud 50 is disposed within the region of the surface 32 and offset approximately 20° of arc from the region of juncture of the surfaces 32 and 36. Surrounding each of the studs 48, 50 and interposed between the bracket 40 and the shoe 30 are coil-compression springs 54. These springs 54 are substantially coaxial with the respective studs and serve as a biasing means to urge the cylindrical surface 32 into engagement with the chain links 22 over slightly more than a quadrant of the length of the lower run of the chain that is disposed over the sprocket 14.

Means are also provided for maintaining the center of the arcuate surface 32 on center with the drive shaft 16. For this purpose the shoe has welded thereto a rearwardly extending rectangular plate 56 that is intermediate the studs 48, 50. This plate 56 slides between a pair of bars 60, 60 which are secured at their opposite ends to the legs 42, 44. Extending between the plates 60, 60 is a short bearing block 62 upon which the plate 56 is slidable.

Figure 5:
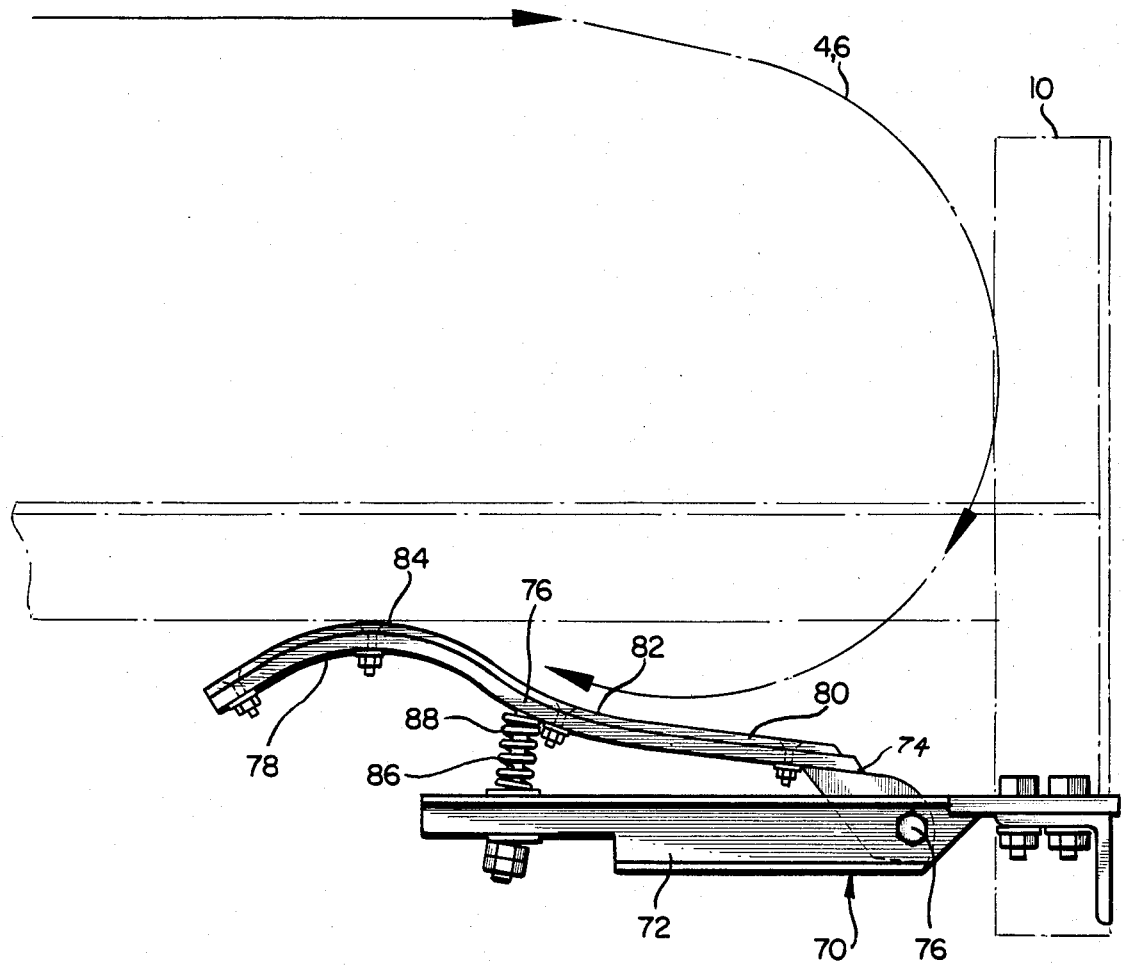
FIG. 5 is a side elevation of a further form of the invention.
Figure 6:
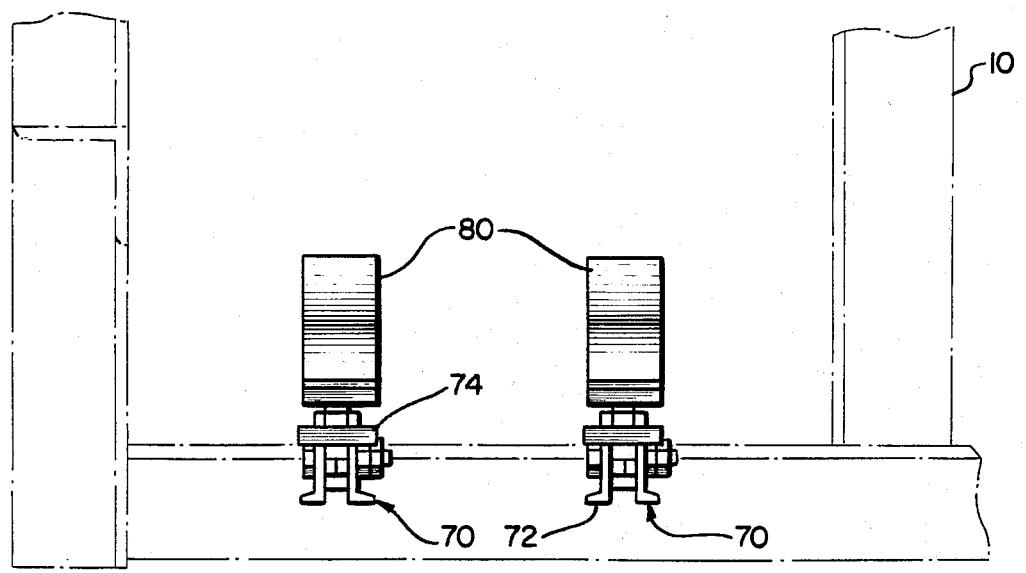
FIG. 6 is an end elevation of the structure of FIG. 5.

FIG. 4 shows a modified form of the invention which is similar to that shown in FIGS. 2 and 3 except that the shoe 30a is extended so that more of the shoe is disposed over the drive chain. In the form of the invention shown in FIG. 4, the lining with a cylindrical surface 32 is extended further in an arcuate fashion so that approximately 180° (or slightly less) or arc is traversed by the shoe 30a. FIGS. 5 and 6 show a further modified form of retainer for the chains 4, 6, which chains are indicated by the arrow-containing broken lines. The conveyor includes frame 10. For each chain there is a retainer 70, 70. Each retainer includes a bracket 72 that is bolted to the frame. A shoe 74 is secured by pivot bolt 76 to the bracket 72 and comprises convex and concave arcuate sections 76, 78. The shoe is lined with the wear resistant anti-friction material 80 which is bolted thereto. The exposed surface of the material 80 presents concave and convex surfaces 82, 84. During use links of the chains engage concave surface 82 and may engage a small part of surface 84 immediately adjacent to surface 82.

A bolt 86 is secured to the shoe 74 and projects loosely through the bracket 72. A coil compression spring 88 surrounds the bolt 86 and serves to bias the shoe upwardly toward the sprocket and against the chain. Nuts 90, 90 may be used to adjust the amount of spring compression.

The invention is claimed as follows:

1. A guide shoe for retaining a conveyor chain in engagement with and trained around an arc of a sprocket, comprising
   a shoe having an arcuate portion with a concave cylindrical surface complementary to a portion of the arc of a said sprocket,
   a lining of anti-friction material on said arcuate portion and presenting a like concave cylindrical anti-friction surface for disposition along a length of the chain that is trained over a drive sprocket and through said arc,
   a bracket for supporting said shoe and positioned such that the shoe is between the lining and the bracket,
   means carried by said bracket for biasing said shoe for movement toward the sprocket to maintain said concave surface of said lining in contact with said length of chain as it passes through said arc, and, a separate guide means carried by said bracket for engaging and guiding said shoe to compel its movement in a direction radially of said sprocket, thereby to maintain concentricity of said shoe with said sprocket.

2. A guide shoe according to claim 1 in which said biasing means comprises a pair of laterally spaced coil-compression springs, the springs each having a central axis therethrough, the central axes thereof being in substantially 90° angular relation and each positioned therearound to intersect the axis of rotation of the drive sprocket and the arc thereby to assist said engaging and guiding means in biasing said shoe at all times concentrically of said sprocket arc.

* * * * *